(12) United States Patent
Devenyi

(10) Patent No.: US 6,883,396 B1
(45) Date of Patent: Apr. 26, 2005

(54) WIRE-WOUND LEADSCREW ASSEMBLY WITH A PRELOADED LEADSCREW WIRE NUT, AND ITS FABRICATION

(75) Inventor: Gabor Devenyi, Penetanguishene (CA)

(73) Assignee: Raytheon Company, Waltham, MA (US)

( * ) Notice: Subject to any disclaimer, the term of this patent is extended or adjusted under 35 U.S.C. 154(b) by 177 days.

(21) Appl. No.: 10/364,977

(22) Filed: Feb. 12, 2003

Related U.S. Application Data

(63) Continuation-in-part of application No. 10/084,704, filed on Feb. 26, 2002, and a continuation-in-part of application No. 10/265,814, filed on Oct. 7, 2002.

(51) Int. Cl.$^7$ .............................. F16H 1/18; F16H 1/20; F16H 27/02
(52) U.S. Cl. ............................. 74/424.77; 74/474.74; 74/89.42
(58) Field of Search .................. 74/424.71, 424.73, 74/424.74, 424.77, 89.23, 89.32, 89.38, 89.42, 74/388 PS, 409, 440

(56) References Cited

U.S. PATENT DOCUMENTS

| | | | |
|---|---|---|---|
| 2,936,646 A * | 5/1960 | Gould | 74/424.77 |
| 3,534,626 A * | 10/1970 | Elliott et al. | 74/424.77 |
| 3,654,816 A * | 4/1972 | Beery et al. | 74/424.75 |
| 4,074,463 A * | 2/1978 | Colanzi | 49/352 |
| 4,227,426 A * | 10/1980 | Schwanz et al. | 74/424.77 |
| 4,498,350 A * | 2/1985 | Ross | 74/89.42 |
| 4,570,893 A * | 2/1986 | Ballantyne | 248/487 |
| 5,044,222 A * | 9/1991 | Tanaka et al. | 74/500.5 |
| 5,533,417 A | 7/1996 | Devenyi | |
| 5,636,549 A | 6/1997 | Devenyi | |
| 6,142,032 A * | 11/2000 | Creager | 74/441 |
| 6,202,500 B1 * | 3/2001 | Erikson et al. | 74/89.42 |
| 6,513,403 B2 * | 2/2003 | Yatskov | 74/424.77 |

* cited by examiner

Primary Examiner—David A. Bucci
Assistant Examiner—Colby Hansen
(74) Attorney, Agent, or Firm—William C. Schubert; Karl A. Vick

(57) ABSTRACT

A leadscrew assembly has a wire-wound leadscrew driven by a mechanical drive. A preloaded leadscrew wire nut assembly serving as a leadscrew follower includes a first wire nut having at least one turn of a first-nut wire overlying and engaged to the groove between the turns of the thread wire, and a second wire nut having at least one turn of a second-nut wire overlying and engaged to the groove between the turns of the thread wire. The second wire nut is spaced apart from the first wire nut along a leadscrew axis. The leadscrew wire nut assembly further includes a compressed preload spring maintaining a compression preload against the second wire nut, and a wire-nut-assembly housing overlying the first wire nut, the second wire nut, and the preload spring. The wire-nut-assembly housing maintains the preload spring in compression.

19 Claims, 3 Drawing Sheets

WIRE-WOUND LEADSCREW ASSEMBLY WITH A PRELOADED LEADSCREW WIRE NUT, AND ITS FABRICATION

This application is a continuation-in-part of application Ser. No. 10/084,704, filed Feb. 26, 2002, for which priority is claimed and whose disclosure is incorporated by reference; and is a continuation-in-part of application Ser. No. 10/265,814, filed Oct. 7, 2002, for which priority is claimed and whose disclosure is incorporated by reference This invention relates to a mechanical movement to translate rotational to linear motion and, more particularly, to a wire-wound leadscrew linear-movement assembly.

BACKGROUND OF THE INVENTION

Electric motors commonly produce a rotational output, but many mechanisms require that a linear movement be driven by the motor. A leadscrew assembly is one approach for translating the rotational movement of the motor to the required linear movement. In the conventional leadscrew assembly, the thread of an externally threaded leadscrew engages a recirculating ball nut structure, which in turn is engaged to the structure to be driven linearly. As the leadscrew turns, the ball nut structure and the driven structure move linearly.

This conventional leadscrew assembly is relatively expensive to produce due to the precision machining required. It is also limited to relatively large-size devices and coarse thread pitches because of the size of the balls used in the recirculating ball nut structure. The conventional leadscrew assembly may be subject to excessive wear of the threads, particularly if there is any misalignment. The conventional leadscrew also requires careful alignment between the motor, the leadscrew, and the driven structure because of the mechanical engagements at each end of the leadscrew.

An advance in overcoming some of these disadvantages is described in U.S. Pat. No. 5,636,549, whose disclosure is incorporated by reference. The '549 patent discloses a leadscrew in which the thread structure is defined by a wire wound helically around a cylindrical shaft. A leadscrew-nut assembly is also disclosed for engaging the leadscrew to the linear slide assembly.

The approach of the '549 patent is operable for many applications but is not optimal for other applications such as those requiring medium-duty operation where there is a concern with possible misalignment. There is a need for realizing the advantages of the basic approach disclosed in the '549 patent, but in a form more suitable to these other applications, and which reduces the concern with alignment of the elements. The present invention fulfills this need, and further provides related advantages.

SUMMARY OF THE INVENTION

The present invention provides a leadscrew assembly that is particularly suitable for medium-duty applications wherein the loads and speeds of movement are moderate in magnitude. It is highly tolerant of misalignments and is preloaded to avoid backlash and play in the system when the direction of movement is reversed. The leadscrew assembly may be scaled over a wide range of sizes and stiffnesses, but is most desirably applied in small-size applications where the loadings are of medium magnitude. The leadscrew assembly is inexpensive to produce.

In accordance with the invention, a leadscrew assembly comprises a leadscrew comprising a thread wire helically wrapped in a plurality of turns about a leadscrew axis and having a groove between the turns, and a mechanical drive in rotational communication with the leadscrew. Preferably, the leadscrew has no shaft extending through the turns of the thread wire. The thread wire of the leadscrew may be helically wrapped in spaced-apart turns or turns that are in helical contact. Preferably, the thread wire is wrapped in a cylindrical helix. The mechanical drive desirably includes a motor that rotationally drives the leadscrew.

A leadscrew wire nut assembly that serves as a leadscrew follower comprises a first wire nut comprising at least one turn of a first-nut wire overlying and engaged to the groove between the turns of the thread wire, and a second wire nut comprising at least one turn of a second-nut wire overlying and engaged to the groove between the turns of the thread wire. The second wire nut is spaced apart from the first wire nut along the leadscrew axis. A compressed preload spring maintains a compression preload against the second wire nut. A wire-nut-assembly housing overlies the first wire nut, the second wire nut, and the preload spring. The wire-nut-assembly housing maintains the preload spring in compression. In the preferred approach, the first wire nut and the second wire nut are bonded to the wire-nut-assembly housing, and at least one of the first wire nut and the second wire nut is resiliently bonded to the wire-nut-assembly housing.

The wire-nut-assembly housing may be a single continuous piece of wire-nut-assembly housing material, or instead provided as two or more subassemblies. It is preferred that the first-nut wire and the second-nut wire are of substantially the same diameter, and most preferred that the first-nut wire, the second-nut wire, and the thread wire are of substantially the same diameter.

A method for fabricating a leadscrew assembly includes the steps of preparing a leadscrew by wrapping a plurality of turns of a thread wire helically about a leadscrew axis and having a groove between the turns, and engaging a leadscrew wire nut assembly to the leadscrew. The leadscrew wire nut assembly includes a first wire nut comprising at least one turn of a first-nut wire overlying and engaged to the groove between the turns of the thread wire, and a second wire nut comprising at least one turn of a second-nut wire overlying and engaged to the groove between the turns of the thread wire. The second wire nut is spaced apart from the first wire nut along the leadscrew axis. A compressed preload spring maintains a compression preload against the second wire nut. A wire-nut-assembly housing overlies the first wire nut, the second wire nut, and the preload spring. The second wire nut is compliantly bonded to the wire-nut-assembly housing. The wire-nut-assembly housing maintains the preload spring in compression. A mechanical drive is desirably affixed in rotational communication with the leadscrew. Other compatible features discussed herein may be used in conjunction with the method.

The leadscrew may be prepared by winding the thread wire onto a form, and removing the form if the leadscrew is to be shaftless, or leaving the form in place to serve as a leadscrew shaft, or removing the form and inserting a separate shaft.

The engaging of the leadscrew wire nut assembly to the leadscrew may be performed by positioning the wire-nut-assembly housing overlying the leadscrew, threading the first wire nut onto the leadscrew, first bonding the first wire nut to the wire-nut-assembly housing, placing the spring overlying the leadscrew, threading the second wire nut onto the leadscrew, compressing the spring to a compressed state, and second bonding the second wire nut to the wire-nut-assembly housing.

The engaging of the leadscrew wire nut assembly to the leadscrew may instead be performed by providing the wire-nut-assembly housing as a first-wire-nut-subassembly housing and a second-wire-nut-subassembly housing. A first-wire-nut subassembly is formed as the first wire nut threaded onto the leadscrew and bonded to the first-wire-nut-subassembly housing, and a second-wire-nut subassembly is formed as the second wire nut threaded onto the leadscrew and bonded to the second-wire-nut-subassembly housing. The first-wire-nut subassembly is affixed to the second-wire-nut subassembly with the spring compressed against the second wire nut. Compatible features discussed elsewhere herein may be used in relation to this fabrication approach.

The present approach provides a wire-wound leadscrew with a preloaded leadscrew wire nut assembly. The preloading of the leadscrew wire nut assembly locally increases the rigidity of the wire-wound leadscrew within the leadscrew wire nut assembly, while maintaining the flexibility of the leadscrew outside of the leadscrew wire nut assembly, particularly in the case of the shaftless leadscrew. The engagement between the leadscrew and the leadscrew wire nut assembly is a line engagement that extends around the circumference of the leadscrew at least once, and preferably for several turns. The increased rigidity of the leadscrew/ leadscrew wire nut assembly and the long line engagement permits the wire-wound leadscrew to transmit substantial force into the follower, so that the leadscrew assembly is suitable for medium-duty applications rather than being restricted to light-duty applications. Yet the wire-wound leadscrew is still sufficiently flexible that it does not require the highly precise alignment required of conventional machined leadscrews. The line contact between the thread wire and the first-nut wire and the second-nut wire avoids any digging of the leadscrew wire nut assembly into the thread wire.

The present approach is self correcting of potential misalignments between the leadscrew and the leadscrew wire nut assembly. It is tolerant of shock loadings and jamming of the leadscrew and the wire nut assembly, as well as variations in friction and axial loadings. The jamming of conventional machined leadscrews and recirculating-ball followers is of great concern, and jamming can arise from several different types of misalignments. The present approach is highly tolerant of misalignments, and jamming is virtually eliminated. The present approach is also tolerant of variations in the loading in the preload spring. Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
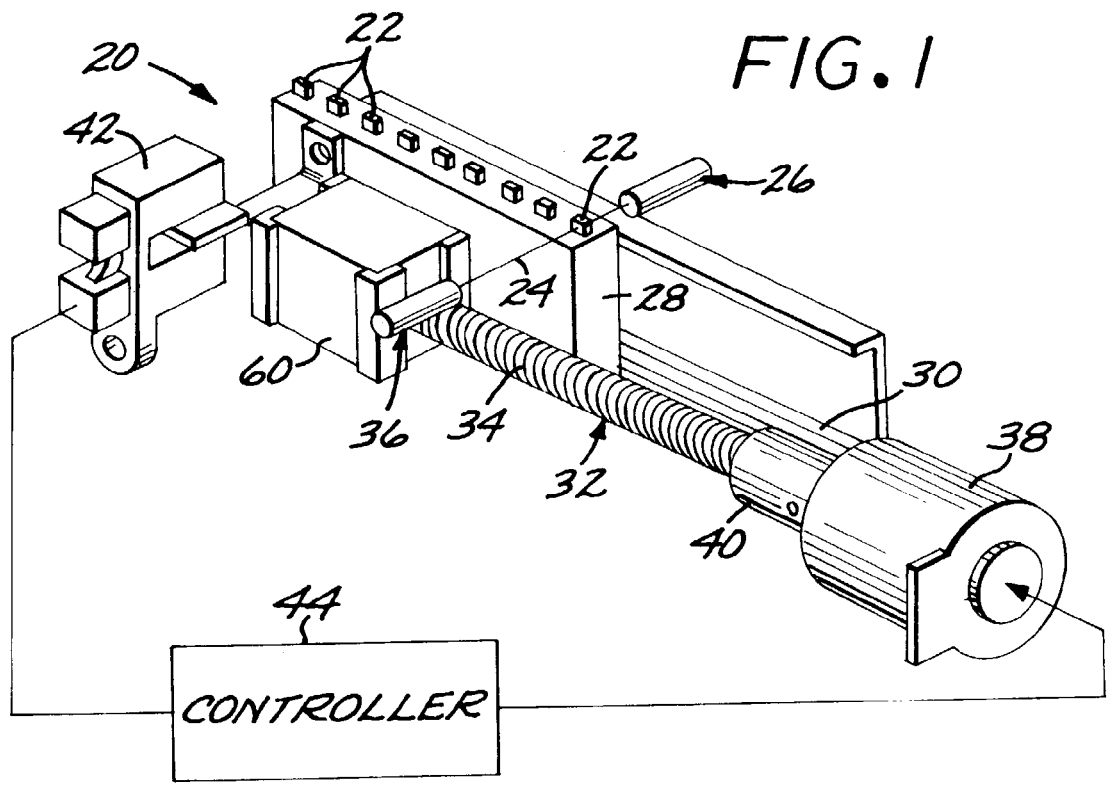
FIG. 1 is a schematic perspective view of a leadscrew assembly used in a filter module.

FIG. 1 depicts a leadscrew assembly 20 in one of its applications. As illustrated, the leadscrew assembly 20 includes a filter module which controllably places a light filter 22 into a light path 24 of an optical fiber light transmission system 26 and thereafter controllably removes the light filter 22 from the light path 24. The leadscrew assembly 20 is presented as an example of a leadscrew drive and its application, but the invention is not so limited. The leadscrew assembly 20 comprises a linearly movable support 28 upon which at least one light filter 22, and preferably a plurality of light filters 22, are mounted. The movable support 28 in the illustrated embodiment is a linear slide mechanism that is linearly movable upon a linear bearing 30. A drive mechanism 32 is operably connected to the movable support 28 to controllably move the light filters 22 into and out of the light path 24.

The drive mechanism 32 includes a leadscrew 34 drivably connected to the movable support 28 through a leadscrew follower 36. A controllable mechanical drive 38, depicted as a motor and specifically as a stepper motor, with a rotating output 40 is in rotational communication with and drives the leadscrew 34, in turn driving the movable support 28 along the linear bearing 30. Optionally but preferably, a positional indicating device 42 is provided in the drive mechanism 32 for indicating the position of the movable support 28. The mechanical drive 38 moves the movable support 28 to a selectable position, and the positional indicating device 42 provides an indication of the actual position of the movable support 28 either continuously or at a fixed location such as an end point of the travel of the movable support 28. The output of the positional indicating device 42 may be used as input to a motor controller 44 that controls the operation of the mechanical drive 38. The motor controller 44 may operate in either this feedback mode or in a non-feedback mode based upon the step positions of the mechanical drive 38.

Figure 2:
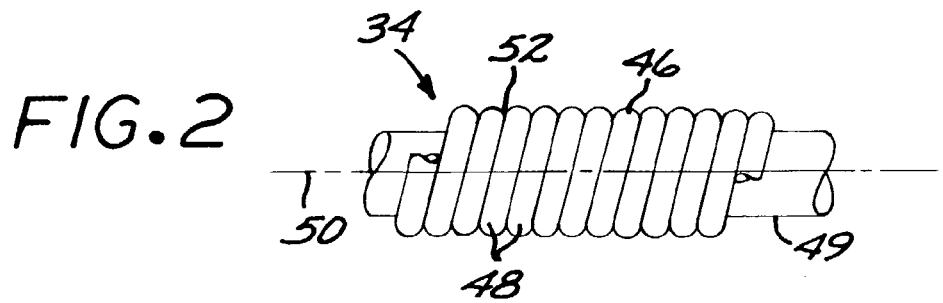
FIG. 2 is an elevational view of a wire leadscrew with helically contacting turns.
Figure 3:
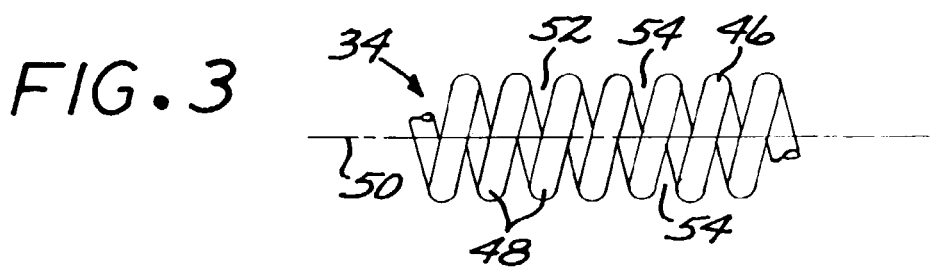
FIG. 3 is an elevational view of a wire leadscrew with spaced-apart turns.

FIGS. 2–3 depict two embodiments of the leadscrew 34 in greater detail. The leadscrew 34 comprises a thread wire 46 helically coiled in a plurality of turns 48 about a leadscrew axis 50. The leadscrew axis 50 may be straight or curved. The turns 48 may be in side-by-side, helical contact, as illustrated in FIG. 2, or spaced-apart from each other, as illustrated in FIG. 3. As used herein, "helical contact" means that each helical turn 48 of the thread wire 46 is side-by-side with and contacts to, but is not joined to, the adjacent turn. As used herein, "spaced-apart" means that each helical turn 48 of the thread wire 46 is side-by-side with, spaced apart from, and not joined to the adjacent turn; that is, there is a small gap 54 between each turn 48. In all embodiments, there may be a shaft 49, either rigid or flexible, extending through the interior of the helix and the helical turns 48 that define the leadscrew 34. The shaft 49 is shown in the embodiment of FIG. 2 and not in the embodiment of FIG. 3, but it may be present or absent in any embodiment of the leadscrew 34. The thread wire 46 is preferably circular in cross section. The helix formed by the coiled thread wire 46 is preferably a cylindrical helix that is initially symmetric about the leadscrew axis 50. However, the helix may be deformed so that the leadscrew axis 50 is not straight.

The helical wrap of the thread wire 46 results in a helical coil that defines a groove 52 between the turns 48. There is such a groove 52 whether the turns 48 are in helical contact (FIG. 2) or are spaced-apart (FIG. 3).

Figure 4:
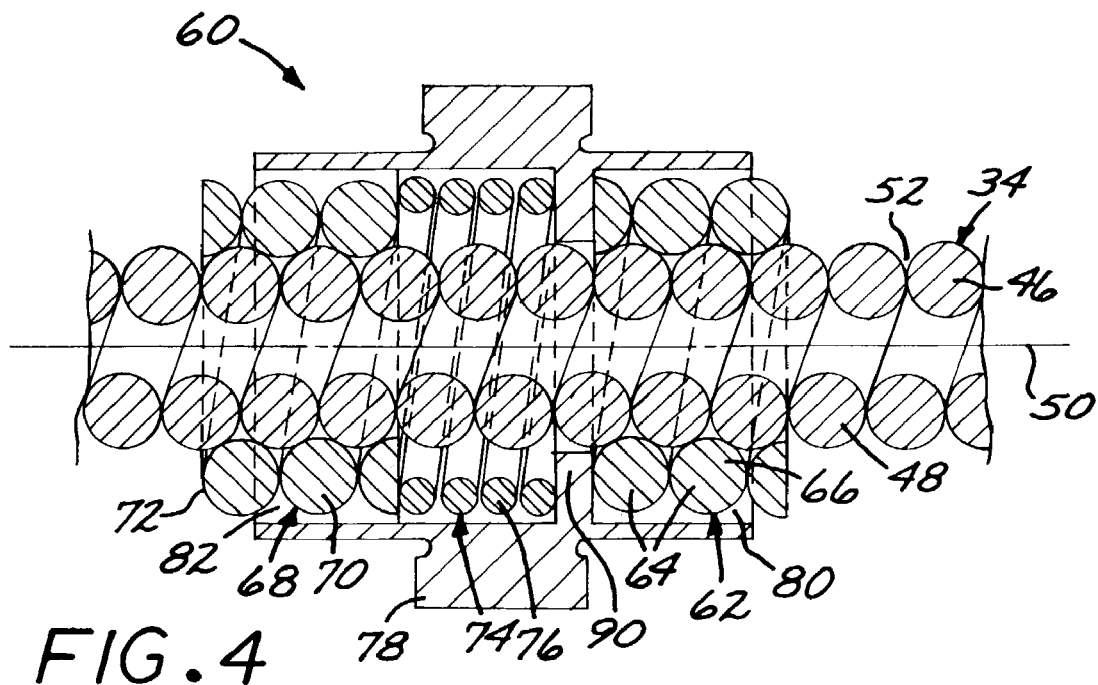
FIG. 4 is a side-sectional view of a first embodiment of a wire-wound leadscrew with helically contacting turns, and engaged to a leadscrew wire nut assembly.
Figure 5:
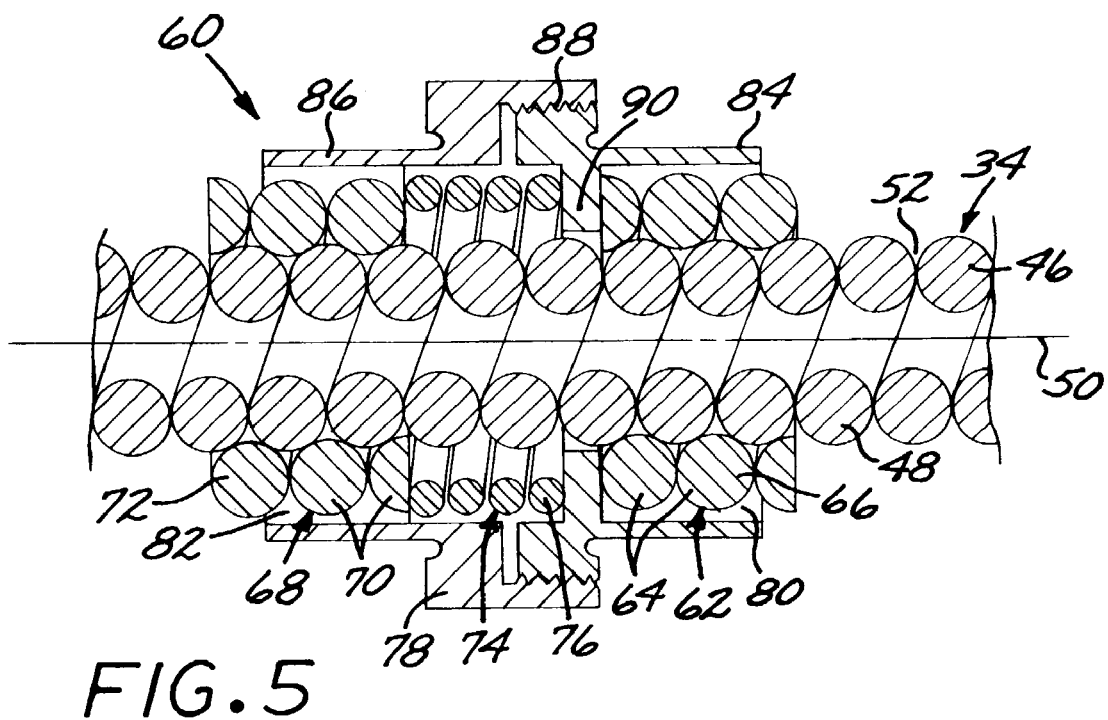
FIG. 5 is a side-sectional view of a second embodiment of a wire-wound leadscrew with helically contacting turns, and engaged to a leadscrew wire nut assembly.
Figure 6:
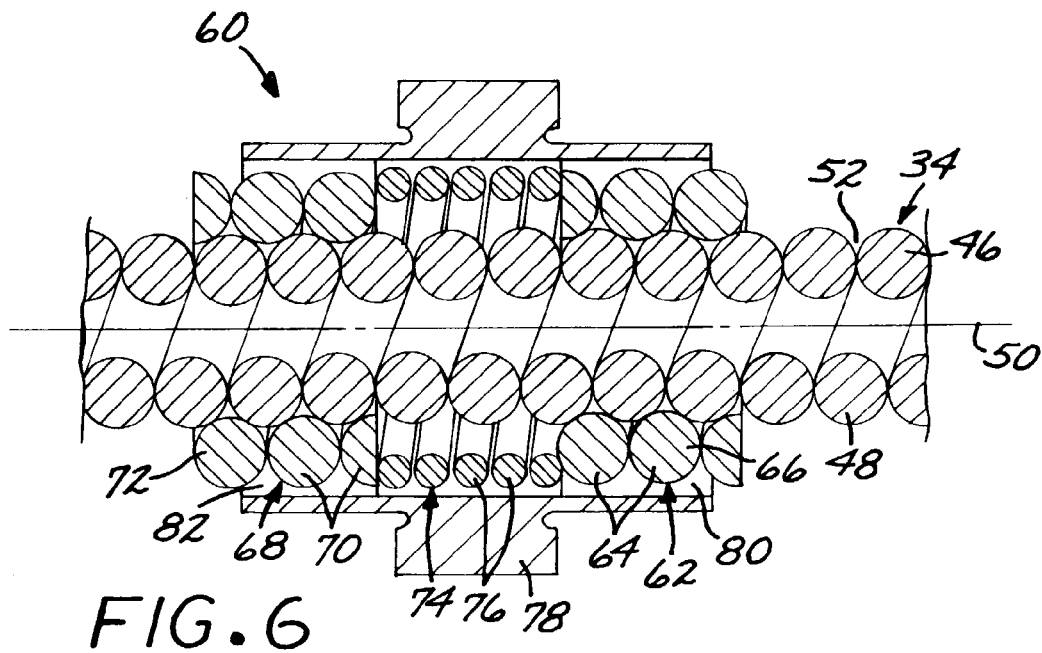
FIG. 6 is a side-sectional view of a third embodiment of a wire-wound leadscrew with helically contacting turns, and engaged to a leadscrew wire nut assembly.

The leadscrew follower 36 includes a leadscrew wire nut assembly 60 that is received in and moves along the groove 52 of the leadscrew 34 as the leadscrew 34 turns, thereby translating the rotational motion of the leadscrew 34 into a linear motion such as required for movement of the linearly movable support 28. FIGS. 4–6 illustrate three embodiments of the leadscrew wire nut assembly 60, all used with a helical-contact leadscrew 34 having no gap between the helical turns 48 and having no shaft 49, the preferred embodiment of the leadscrew 34 for this application. The embodiments of FIGS. 4–6 are similar except as will be indicated, and common reference terms and callout numerals will be used for these embodiments to the extent applicable.

The leadscrew wire nut assembly 60 includes a first wire nut 62 comprising at least one turn 64 of a first-nut wire 66 overlying and engaged to the groove 52 between the turns 48 of the thread wire 46 of the leadscrew 34, and a second wire nut 68 comprising at least one turn 70 of a second-nut wire 72 overlying and engaged to the groove 52 between the turns 48 of the thread wire 46 of the leadscrew 34. The second wire nut 68 is spaced apart from the first wire nut 62 along the leadscrew axis 50. As illustrated, the first-nut wire 66 and the second-nut wire 72 are preferably of substantially the same diameter. Most preferably, the first-nut wire 66, the second-nut wire 72, and the thread wire 46 are of substantially the same diameter. The first-nut wire 66, the second-nut wire 72, and the thread wire 46 are preferably all made of high-carbon steel, such as piano wire.

A compressed preload spring 74 maintains a compression preload against at least one of the wire nuts 62 and 68, and here illustrated as the second wire nut 68. The preload spring 74 is preferably a coil spring made of a spring wire 76 of smaller diameter than the diameters of the first-nut wire 66 and the second-nut wire 72.

A wire-nut-assembly housing 78 overlies the first wire nut 62, the second wire nut 68, and the preload spring 74. The wire-nut-assembly housing 78 maintains the preload spring 74 in compression.

The first wire nut 62 and the second wire nut 68 are bonded to the wire-nut-assembly housing 78 by a respective first adhesive bond 80 and a second adhesive bond 82. At least the wire nut against which the preload spring 74 maintains its compression loading, in this case the second wire nut 68, is resiliently bonded to the wire-nut-assembly housing. In the embodiments of FIGS. 4 and 5, the first adhesive bond 80 is a hard adhesive bond in which the adhesive is substantially rigid, and the second adhesive bond 82 is a resilient adhesive bond. In the embodiment of FIG. 6, the first adhesive bond 80 and the second adhesive bond 82 may both be resilient adhesive bonds. An acceptable material for the hard adhesive bond is an epoxy such as Armstrong A12/A&B, 3M Scotchweld 2214, or Hysol Epoxy Patch 1CWH1. An acceptable material for the resilient adhesive bond is an RTV silicone such as GE 162 Silicone or GE 560 Silicone. The preload spring 74 is not bonded to the wire-nut-assembly housing 78.

The hard adhesive bond is substantially inflexible, while the resilient adhesive bond is flexible and allows a small amount of movement of the wire nut bonded with the resilient adhesive bond responsive to the compressive force of the preload spring 74. In the illustrated embodiments of FIGS. 4–6, the second wire nut 68 is bonded with the resilient adhesive bond 82. The turns 70 of the second-nut wire 72 of the second wire nut 68 are thereby pressed against the turns 48 of the thread wire 46 of the leadscrew 34 to maintain a preload on the turns 70 of the leadscrew 34. The increased rigidity of the leadscrew 34 and the leadscrew wire nut assembly 60, in the region where the two contact each other, increases the amount of force that the leadscrew assembly 20 may transmit through the leadscrew 34 and the leadscrew wire nut assembly 60 of the leadscrew follower 36 without becoming mechanically unstable. It also avoids backlash when the direction of rotation of the leadscrew 34 is reversed. These improvements are attained while the leadscrew 34 maintains its relative insensitivity to misalignment in the preferred case of the absence of the shaft.

The embodiments of FIGS. 4–6 differ in the structure of the wire-nut-assembly housing 78 and the reaction of the preload spring 74. In the embodiment of FIG. 4, the wire-nut-assembly housing 68 is a single continuous piece of a wire-nut-assembly housing material. In the embodiment of FIG. 5, the wire-nut-assembly housing 78 is formed as a first-wire-nut-subassembly housing 84 and a second-wire-nut-subassembly housing 86. The first-wire-nut-subassembly housing 84 and the second-wire-nut-subassembly housing 86 are joined together in the final assembly by a joint 88, in the illustrated case an axially threaded joint. This embodiment allows the compressive preload in the preload spring 74 to be adjusted after assembly. The joint 88 may be maintained as adjustable during service. It may instead be made permanent after the adjustment of the compressive preload during assembly, as by injecting an adhesive into the joint 88 after assembly and the setting of the compressive preload is complete.

The joint 88 may be positioned as illustrated, so that the compressive force reacts between the two subassembly housings 84 and 86, to allow for the adjustability of the compressive force of the preload spring 74. The joint may instead be positioned so that the preload spring is wholly contained within one of the two subassembly housings. In this case, the compressive load of the preload spring is not adjustable with the joint, but the approach may make the fabrication and assembly easier.

In the embodiments of FIGS. 4–5, the preload spring 74 reacts its compressive force directly between the wire-nut-assembly housing 78, using an inward shoulder 90 of the housing 78, and the second wire nut 68. In the embodiment of FIG. 6, the preload spring 74 contacts and reacts its compressive force between the first wire nut 62 and the second wire nut 68. The reaction of the compressive force is ultimately through the wire-nut-assembly housing 78, because the first wire nut 62 and the second wire nut 68 are both bonded to the wire-nut-assembly housing 78. In this case, however, the first adhesive bond 80 between the wire nut 62 and the wire-nut-assembly housing 78 may also be a resilient adhesive bond. The embodiment of FIG. 6 is illustrated as having a single continuous wire-nut-assembly housing 78 as in the embodiment of FIG. 4, but it also may be made of wire-nut-assembly subhousings as in FIG. 5. In each case, the wire-nut-assembly housing 78 serves to maintain the preload spring 74 in compression.

Figure 7:
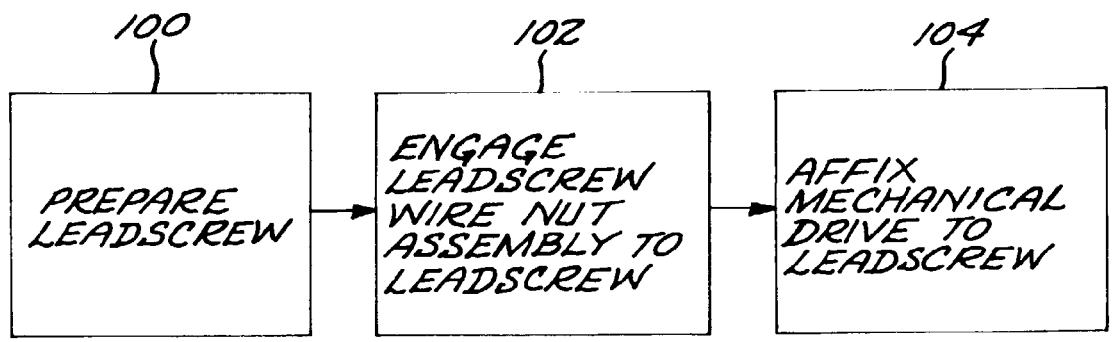
FIG. 7 is a block flow diagram of an approach for fabricating the leadscrew assembly.

FIG. 7 illustrates a preferred approach for fabricating the leadscrew assembly 20. The leadscrew 34 is prepared by wrapping, step 100, a plurality of turns 48 of the thread wire 46 helically about the leadscrew axis 50 with the groove 52 between the turns 48. In a preferred approach, the thread wire 46 is wound onto a form, and the form is preferably removed. However, the form may remain to serve as the shaft 49, or a different shaft may be inserted.

The leadscrew wire nut assembly 60 is engaged to the leadscrew 34, step 102. The leadscrew wire nut assembly 60 has any operable structure within the scope of the present approach, with the structures of FIGS. 4–6 as described above being preferred.

Three approaches to engaging the leadscrew wire nut assembly 60 to the leadscrew 34 are of particular interest. In the first, the wire-nut-assembly housing 78 is positioned overlying the leadscrew 34. The first wire nut 62 is formed and threaded onto the leadscrew 34, and the first wire nut 62 is first bonded to the wire-nut-assembly housing 78 with the first adhesive bond 80. The preload spring 74 is placed overlying the leadscrew 34. The second wire nut 68 is threaded onto the leadscrew 34, compressing the preload spring 74 to a compressed state. The second wire nut 68 is thereafter bonded to the wire-nut-assembly housing 78 with the second adhesive bond 82, permanently establishing the compressive preload in the preload spring 74.

In a variation of this approach, the entire leadscrew wire nut assembly 60 is assembled as a unit on tooling that is a replica of the leadscrew 34, removed from the tooling, and threaded onto the leadscrew 34.

In another approach used where there are subassembly housings, as in the embodiment of FIG. 5, the wire-nut-assembly housing 78 is provided as the first-wire-nut-subassembly housing 84 and the second-wire-nut-subassembly housing 86. A first-wire-nut subassembly is formed as the first wire nut 62 threaded onto the leadscrew 34 and bonded by the first adhesive bond 80 to the first-wire-nut-subassembly housing 84. This first-wire-nut subassembly may be initially fabricated as the first wire nut 62 bonded to the first-wire-nut-subassembly housing 84 separate from the leadscrew 34, and thereafter threaded onto the leadscrew 34. Similarly, a second-wire-nut subassembly is formed as the second wire nut 68 threaded onto the leadscrew 34 and bonded by the second adhesive bond 82 to the second-wire-nut-subassembly housing 86. This second-wire-nut subassembly may be initially fabricated as the second wire nut 68 bonded to the second-wire-nut-subassembly housing 86 separate from the leadscrew 34, and thereafter threaded onto the leadscrew 34. The first-wire-nut subassembly is affixed to the second-wire-nut subassembly with the preload spring 74 compressed against the second wire nut 68, as by using the joint 88 of a threaded, adhesive, or other operable type.

The mechanical drive 38 is affixed in rotational communication with the leadscrew 34, step 104.

The present approach has been reduced to practice as a prototype of the FIG. 4 embodiment, and has been found to be operable as described herein.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A leadscrew assembly comprising:
    a leadscrew comprising a thread wire helically wrapped in a plurality of turns about a leadscrew axis and having a groove between the turns; and
    a leadscrew wire nut assembly comprising
        a first wire nut comprising at least one turn of a first-nut wire overlying and engaged to the groove between the turns of the thread wire,
        a second wire nut comprising at least one turn of a second-nut wire overlying and engaged to the groove between the turns of the thread wire, wherein the second wire nut is spaced apart from the first wire nut along the leadscrew axis,
        a compressed preload spring maintaining a compression preload against the second wire nut, and
        a wire-nut-assembly housing overlying the first wire nut, the second wire nut, and the preload spring, wherein the wire-nut-assembly housing maintains the preload spring in compression.

2. The leadscrew assembly of claim 1, wherein the leadscrew has no shaft extending therethrough.

3. The leadscrew assembly of claim 1, wherein the thread wire is helically wrapped in spaced-apart turns.

4. The leadscrew assembly of claim 1, wherein the thread wire is helically wrapped in helical contact.

5. The leadscrew assembly of claim 1, wherein the thread wire is wrapped in a cylindrical helix.

6. The leadscrew assembly of claim 1, wherein the leadscrew assembly further includes
    a mechanical drive in rotational communication with the leadscrew.

7. The leadscrew assembly of claim 6, wherein the mechanical drive includes
    a motor that rotationally drives the leadscrew.

8. The leadscrew assembly of claim 1, wherein the first wire nut and the second wire nut are bonded to the wire-nut-assembly housing, and wherein at least the second wire nut is resiliently bonded to the wire-nut-assembly housing.

9. The leadscrew assembly of claim 1, wherein the wire-nut-assembly housing is a single continuous piece of a wire-nut-assembly housing material.

10. The leadscrew assembly of claim 1, wherein the first-nut wire and the second-nut wire are of substantially the same diameter.

11. The leadscrew assembly of claim 1, wherein the first-nut wire, the second-nut wire, and the thread wire are of substantially the same diameter.

12. A leadscrew assembly comprising:
    a leadscrew comprising a thread wire helically wrapped in a plurality of cylindrical-helix turns about a leadscrew axis and having a groove between the turns, wherein the leadscrew has no shaft extending therethrough;
    a mechanical drive in rotational communication with the leadscrew; and
    a leadscrew wire nut assembly comprising
        a first wire nut comprising at least one turn of a first-nut wire overlying and engaged to the groove between the turns of the thread wire, wherein the first-nut wire is of substantially the same diameter as the thread wire,
        a second wire nut comprising at least one turn of a second-nut wire overlying and engaged to the groove between the turns of the thread wire, wherein the second-nut wire is of substantially the same diameter as the thread wire, and wherein the second wire nut is spaced apart from the first wire nut along the leadscrew axis,
        a compressed preload spring maintaining a compression preload against the second wire nut, and
        a wire-nut-assembly housing overlying the first wire nut, the second wire nut, and the preload spring, wherein the first wire nut and the second wire nut are bonded to the wire-nut-assembly housing, and wherein at least the second wire nut is compliantly bonded to the wire-nut-assembly housing, whereby the wire-nut-assembly housing maintains the preload spring in compression.

13. The leadscrew assembly of claim 12, wherein the mechanical drive includes
a motor that rotationally drives the leadscrew.

14. The leadscrew assembly of claim 12, wherein the wire-nut-assembly housing is a single continuous piece of a wire-nut-assembly housing material.

15. A method for fabricating a leadscrew assembly, comprising the steps of
preparing a leadscrew by wrapping a plurality of turns of a thread wire helically about a leadscrew axis and having a groove between the turns; and
engaging a leadscrew wire nut assembly to the leadscrew, the leadscrew wire nut assembly including,
a first wire nut comprising at least one turn of a first-nut wire overlying and engaged to the groove between the turns of the thread wire,
a second wire nut comprising at least one turn of a second-nut wire overlying and engaged to the groove between the turns of the thread wire, wherein the second wire nut is spaced apart from the first wire nut along the leadscrew axis,
a compressed preload spring maintaining a compression preload against the second wire nut, and
a wire-nut-assembly housing overlying the first wire nut, the second wire nut, and the preload spring, wherein the second wire nut is compliantly bonded to the wire-nut-assembly housing, and whereby the wire-nut-assembly housing maintains the preload spring in compression.

16. The method of claim 15, wherein the step of forming the leadscrew includes the steps of
winding the thread wire onto a form, and
removing the form.

17. The method of claim 15, wherein the step of engaging the leadscrew wire nut assembly to the leadscrew includes the steps of
positioning the wire-nut-assembly housing overlying the leadscrew,
threading the first wire nut onto the leadscrew,
first bonding the first wire nut to the wire-nut-assembly housing,
placing the preload spring overlying the leadscrew,
threading the second wire nut onto the leadscrew, thereby compressing the preload spring to a compressed state, and
second bonding the second wire nut to the wire-nut-assembly housing.

18. The method of claim 15, wherein the step of engaging the leadscrew wire nut assembly to the leadscrew includes the steps of
providing the wire-nut-assembly housing as a first-wire-nut-subassembly housing and a second-wire-nut-subassembly housing,
forming a first-wire-nut subassembly as the first wire nut threaded onto the leadscrew and bonded to the first-wire-nut-subassembly housing,
forming a second-wire-nut subassembly as the second wire nut threaded onto the leadscrew and bonded to the second-wire-nut-subassembly housing, and
affixing the first-wire-nut subassembly to the second-wire-nut subassembly with the preload spring compressed against the second wire nut.

19. The method of claim 15, wherein the method includes an additional step of
affixing a mechanical drive in rotational communication with the leadscrew.

* * * * *